United States Patent
Ohkawa et al.

(10) Patent No.: US 6,767,953 B2
(45) Date of Patent: Jul. 27, 2004

(54) POLYPROPYLENE RESIN COMPOSITION AND INJECTION-MOLDED ARTICLE THEREOF

(75) Inventors: Kenichi Ohkawa, Ichihara (JP); Shin-ichi Kondo, Bartlesville, OK (US)

(73) Assignee: Sumitomo Chemical Company, Limited, Osaka (JP)

( * ) Notice: Subject to any disclaimer, the term of this patent is extended or adjusted under 35 U.S.C. 154(b) by 188 days.

(21) Appl. No.: 09/898,011

(22) Filed: Jul. 5, 2001

(65) Prior Publication Data

US 2002/0037954 A1 Mar. 28, 2002

(30) Foreign Application Priority Data

Jul. 6, 2000 (JP) ........................................ 2000-204794

(51) Int. Cl.$^7$ ................................................. C08L 3/00
(52) U.S. Cl. ........................ 524/451; 524/240; 524/241
(58) Field of Search ................................ 524/451, 240, 524/241

(56) References Cited

U.S. PATENT DOCUMENTS 5,914,363 A * 6/1999 Sadatoshi et al. ........... 524/451
6,015,857 A * 1/2000 Sobajima et al. ........... 524/451
6,441,081 B1 * 8/2002 Sadatoshi et al. ........... 524/451

FOREIGN PATENT DOCUMENTS

| JP | 08/134278 | | 5/1996 |
| JP | 8/134278 | * | 5/1996 |
| JP | 10/060182 | | 3/1998 |

* cited by examiner

Primary Examiner—Robert D. Harlan
(74) Attorney, Agent, or Firm—Birch, Stewart, Kolasch & Birch, LLP

(57) ABSTRACT

A polypropylene resin composition comprising:

100 parts by weight of a polypropylene composition (D) comprising 50% to 95% by weight of a polypropylene (A), 0% to 25% by weight of an ethylene-α-olefin copolymer rubber and/or aromatic vinyl compound-containing rubber (B), and 5% to 25% by weight of talc (C) having an average particle diameter of not more than 3 μm; and 0.5 to 8.0 parts by weight of a pigment master batch (E) having a hydrogen ion concentration of 5 to 7 and satisfying the expression: $0.35 \leq \eta \text{pig}/\eta \text{comp} \leq 1.20$, wherein the ηpig represents a viscosity (poise) of the pigment master batch, and the ηcomp represents a viscosity (poise) of the polypropylene composition (D).

10 Claims, No Drawings

POLYPROPYLENE RESIN COMPOSITION AND INJECTION-MOLDED ARTICLE THEREOF

BACKGROUND OF THE INVENTION

1. Field of the Invention

The present invention relates to a polypropylene resin composition and an injection-molded article thereof. More specifically, it relates to a polypropylene resin composition exhibiting a superior pigment dispersibility and an injection-molded article thereof.

2. Description of Related Arts

Polypropylene resins are widely used as materials requiring rigidity, impact strength and the like. In recent years, molded articles molded from a composition comprising a polypropylene resin by injection molding or the like, have begun to be used particularly as materials for automobiles. Such molded articles are required to have mechanical properties, such as rigidity and impact strength, as well as good appearance such as to provide an integral appearance unified with an automobile body, an upgraded image, and high design properties or the like. As such a composition, there is known a composition composed of an ethylene-propylene block copolymer, a rubber such as an ethylene-α-olefin copolymer rubber or an aromatic vinyl-containing rubber, used to improve the impact resistance, talc used to improve the rigidity, and a pigment master batch used for coloring.

For instance, JP08-134278A discloses a compound for molding composed of a propylene-α-olefin block copolymer resin, a modified polyolefin, a pigment, a pigment dispersant, a silane coupling agent, a rubber component, and an inorganic filler; and a compound for molding composed of a propylene-α-olefin block copolymer resin, a pigment, a pigment dispersant containing amodifiedwax, a silane coupling agent, a rubber component, and an inorganic filler. Specifically, there are disclosed a compound in which a maleic anhydride graft polypropylene is used as the modified polyolefin, and a compound in which a maleic acid-modified polyethylene wax is used as the modified wax contained in the pigment dispersant.

JP10-60182A discloses a composition composed of a polyolefin, a filler, a pigment, and an olefin-based polymer wax. Specifically, there is discloses a composition containing a polyethylene wax or a polypropylene wax as the olefin-based polymer wax.

Molded article molded from these polypropylene resin compositions by injection molding, however, sometimes have a portion that appears to be different in color from the rest at a molded article surface formed just at the back of the gate or at a molded article surface on an extension of the gate in a part in which the wall thickness changes and, therefore, the appearance thereof is often damaged. This is considered to be caused by insufficient dispersion of the pigment resulting from differences in pigment concentration and talc concentration at a part of the surface portion of the molded article which occur due to separation or agglomeration of the ingredients of the composition during the injection molding.

SUMMARY OF THE INVENTION

In view of the foregoing circumstances, the inventors of the present invention have made intensive study and, as a result, found that the foregoing problems can be solved by a specific polypropylene resin composition containing a specific polypropylene composition and a pigment master batch having a specified hydrogen ion concentration and a specified viscosity ηpig(poise).

An object of the present invention is to provide a polypropylene resin composition excellent in pigment dispersibility.

Another object of the invention is to provide an injection molded article of said composition, suitable for automobile exterior and interior parts.

Other objects and advantages of the present invention will be apparent from the following description.

That is, the present invention relates to a polypropylene resin composition comprising:

100 parts by weight of a polypropylene-based composition (D) comprising 50% to 95% by weight of a polypropylene resin (A), 0% to 25% by weight of an ethylene-α-olefin copolymer rubber and/or aromatic vinyl compound-containing rubber (B), and 5% to 25% by weight of talc (C) having an average particle diameter of not more than 3 μm; and 0.5 to 8.0 parts by weight of a pigment master batch (E) having a hydrogen ion concentration of 5 to 7 and satisfying the expression: $0.35 \leq \eta pig/\eta comp \leq 1.20$, wherein the ηpig represents a viscosity (poise) of the pigment master batch, and the ηcomp represents a viscosity (poise) of the polypropylene-based composition (D), and to an injection-molded product thereof.

The present invention will be described in detail below.

DETAILED DESCRIPTION OF THE INVENTION

The polypropylene resin (A) used in the present invention is not particularly limited, but preferably a polypropylene resin having crystallinity, examples of which include a crystalline propylene homopolymer, a crystalline ethylene-propylene copolymer, a crystalline propylene-α-olefin copolymer, and the like. These copolymers may be used alone or in combination of two or more thereof.

The α-olefin used in the crystalline propylene-α-olefin copolymer is an α-olefin having 4 or more carbon atoms, preferably 4 to 12 carbon atoms and examples thereof include 1-butene, 1-pentene, 1-hexene, 1-heptene, 1-octene, and 1-decene. The crystalline propylene-α-olefin copolymer is, for example, a crystalline propylene-1-butene copolymer, a crystalline propylene-1-hexene copolymer, or the like.

The polypropylene resin having crystallinity is particularly preferably a crystalline ethylene-propylene block copolymer or a mixture of a crystalline ethylene-propylene block copolymer and a crystalline propylene homopolymer.

The process for producing the polypropylene resin (A) used in the present invention is not particularly limited. The resin (A) can be produced by, for example, a known polymerization process, such as bulk polymerization process, solution polymerization process, slurry polymerization process, or gas phase polymerization process, with use of a known catalyst, such as a Ziegler-Natta catalyst and/or a metallocene catalyst, or any desired combination of these processes.

With respect to the crystalline ethylene-propylene block copolymer, in particular, preferable ones are produced in a manner that a crystalline propylene homopolymer portion as a first segment is formed at the first step, and subsequently, an ethylene-propylene random copolymer portion as a second segment is formed at the second step.

The mixing amount of the polypropylene resin (A) in the polypropylene-based composition (D) is 50% to 95% by weight, preferably 55% to 90% by weight, more preferably 60% to 85% by weight.

When the mixing amount of the polypropylene (A) is less than 50% by weight, the rigidity may lower. When it is more than 95% by weight, the impact resistance may lower.

The ethylene-α-olefin random copolymer rubber used in the present invention is a random copolymer rubber comprising ethylene and an α-olefin. The α-olefin used in the ethylene-α-olefin random copolymer rubber is an α-olefin having three or more carbon atoms, examples of which include propylene, 1-butene, 1-pentene, 1-hexene, 1-heptene, 1-octene, 1-decene and the like. Propylene, 1-butene, 1-hexene, and 1-octene are preferable.

Examples of ethylene-α-olefin random copolymer rubbers include an ethylene-propylene random copolymer rubber, an ethylene-1-butene random copolymer rubber, an ethylene-1-hexene random copolymer rubber, and an ethylene-1-octene random copolymer rubber. The ethylene-1-octene random copolymer rubber, ethylene-1-butene random copolymer rubber, and ethylene-propylene random copolymer rubber are preferable. Two or more kinds of ethylene-α-olefin random copolymer rubbers may be used in combination.

A process for preparing the ethylene-α-olefin random copolymer rubber is not particularly limited. The copolymer rubber can be prepared by a known polymerization process causing copolymerization of ethylene and any one of various α-olefins with use of a known catalyst. Examples of known catalysts include a catalyst system composed of a vanadium compound and an organoaluminum compound, a Ziegler-Natta catalyst system, and a metallocene catalyst system. Examples of known polymerization processes include a solution polymerization process, a slurry polymerization process, a high-pressure ion polymerization process, a gas phase polymerization process, and the like.

The aromatic vinyl compound-containing rubber used in the present invention is, for example, a block copolymer containing an aromatic vinyl polymer block and a conjugated diene polymer block. The hydrogenation degree of the double bonds of the conjugated diene portion in such a block copolymer is preferably 80% or more, more preferably 85% or more. Further, the molecular-weight distribution (Q value) of the aromatic vinyl compound-containing rubber determined by GPC (Gel Permeation Chromatography) is preferably not more than 2.5, more preferably not more than 2.3. The average content of the aromatic vinyl compound unit in the aromatic vinyl compound-containing rubber is preferably 10% to 20% by weight, more preferably 12% to 19% by weight. The melt flow rate (MFR, JIS-K-6758, 230 C) of the aromatic vinyl compound-containing rubber is preferably 1 to 15 g/10 min, more preferably 2 to 13 g/10 min.

Examples of aromatic vinyl compound-containing rubbers include aromatic vinyl compound-containing copolymer rubbers such as a styrene-butadiene random copolymer rubber (SBR), a styrene-butadiene-styrene block copolymer rubber (SBS), an d a styrene-isoprene-styrene block copolymer rubber (SIS), and hydrogenated products thereof such as a styrene-ethylene-butene-styrene rubber (SEBS), a styrene-ethylene-propylene-styrene rubber (SEPS). Alternatively, a rubber prepared by allowing an ethylene-propylene-nonconjugated diene copolymer rubber (EPDM) to react with an aromatic vinyl compound such as styrene may be preferably used. And, two or more kinds of aromatic vinyl compound-containing rubbers may be used in combination.

A method for producing the aforementioned aromatic vinyl compound-containing rubber is not particularly limited. For example, a method such as to combine an aromatic vinyl with an olefin copolymer rubber or a conjugated diene rubber by polymerization, reaction or the like, can be mentioned.

The mixing ratio of the ethylene-α-olefin copolymer rubber and/or aromatic vinyl compound-containing rubber (B) is 0% to 25% by weight, preferably 5% to 20% by weight. When the mixing ratio of the ethylene-α-olefin copolymer rubber and/or aromatic vinyl compound-containing rubber (B) is more than 25% by weight, the rigidity and the heat resistance may lower.

The talc (C) used in the present invention is hydrous magnesium silicate. The crystal structure of molecules of the hydrous magnesium silicate is a layered structure in which pyrophyllite-type triple-layer structures are stacked. The hydrous magnesium silicate is preferably ground. Particularly preferably, the hydrous magnesium silicate is in a plate-like form obtained by finely pulverizing the crystal thereof to about a unit layer.

The talc (C) used in the present invention has an average particle diameter of not more than 3 μm. The average particle diameter of talc herein means 50% equivalent particle diameter $D_{50}$ determined from an integral distribution curve obtained by a sub-sieve method of a suspension of talc in a dispersing medium, such as water or alcohol, with use of a centrifugal sedimentation type particle size distribution analyzer.

The hydrogen ion concentration of the talc (C) used in the present invention is preferably 8 to 10 from a view point of pigment dispersibility. Herein, the hydrogen ion concentration of talc means a value measured according to JIS-K-5101.

The talc may be used as untreated or as surface-treated with various known silane coupling agents, titanium coupling agents, higher fatty acids, higher fatty esters, higher fatty amides, salts of higher fatty acids, or other surface active agents to improve the interfacial adhesion with the polypropylene resin (A) or improve the dispersibility.

The mixing proportion of the talc (C) used in the present invention is 5% to 25% by weight, preferably 10% to 25% by weight. When the mixing ratio of the talc is less than 5% by weight, the rigidity may lower. When it is more than 25% by weight, the impact resistance may become insufficient.

The polypropylene-based composition (D) used in the present invention comprises 50% to 95% by weight of the polypropylene resin (A), 0% to 25% by weight of the ethylene-α-olefin copolymer rubber and/or aromatic vinyl compound-containing rubber (B), and the talc (C) having an average particle diameter of not more than 3 μm, wherein the sum of the polypropylene resin (A), ethylene-α-olefin copolymer rubber and/or aromatic vinyl compound-containing rubber (B) and the talc (C) is 100% by weight.

The pigment ingredient of the pigment master batch (E) used in the present invention is not particularly limited, and conventional pigment ingredients used to color a polypropylene resin composition can be used. Examples of the pigment ingredient include polyazo pigments, phthalocyanine pigments, perylene-perinone pigments, carbon black, titanium oxide, ultramarine, and red iron oxide. These pigment gredients may be used alone or in combination of two or more of them.

Dispersion media used with respect to such pigment ingredients are: metal salts, such as of calcium, magnesium, aluminum, and zinc, of higher fatty acids, such as stearic acid and lauric acid; polyethylene waxes having a molecular weight of about 500 to about 20,000, obtained by thermally decomposing a known polyethylene under appropriate conditions, or polyethylene waxes having molecular weight of about 500 to about 20,000, obtained by polymerizing ethylene under appropriate conditions; polypropylene waxes having molecular weight of about 1,000 to about 20,000, obtained by thermally decomposing known polypropylene under appropriate conditions; or polypropylene waxes having molecular weight of about 1,000 to about 20,000, obtained by polymerizing propylene under appropriate conditions. These dispersion media may be used alone or in combination of two or more of them.

The pigment master batch (E) used in the present invention has a hydrogen ion concentration (measured according to JIS-K-5101) of 5 to 7, preferably 5.5 to 6.5. When the hydrogen ion concentration is less than 5 or more than 7, the pigment dispersibility may become insufficient.

The viscosity $\eta pig$ (poise) of the pigment master batch (E) used in the present invention is such that the viscosity ratio ($\eta pig/\eta comp$) of the viscosity $\eta pig$ (poise) to the viscosity $\eta comp$ (poise) of the polypropylene-based composition (D) satisfies the relation: $0.35 \leq \eta pig/\eta comp \leq 1.20$. Preferably, the viscosity ratio satisfies the relation: $0.45 \leq \eta pig/\eta comp \leq 1.10$. The viscosity $\eta pig$ of the pigment master batch (E) and the viscosity $\eta comp$ of the polypropylene resin composition are determined by capillary melt visco elasticity measurement under conditions at 230° C., L/D of 40, and a shear rate of 1216 $sec^{-1}$. When the viscosity ratio ($\eta pig/\eta comp$) is less than 0.35 or more than 1.20, the pigment dispersibility may become insufficient.

The content of the pigment master batch (E) used in the present invention is 0.5 to 8.0 parts by weight, preferably 1.0 to 6.0 parts by weight based on 100 parts by weight of the polypropylene-based composition (D). When the content of the pigment master batch (E) is less than 0.5 parts by weight, the appearance of a molded article thereof may be inferior. When it is more than 8.0 parts by weight, the rigidity and the impact resistance may lower.

The polypropylene resin composition of the present invention may be admixed with maleic acid-modified polypropylene (F). In view of the pigment dispersibility and the impact strength, the content of maleic acid in the maleic acid-modified polypropylene (F) is preferably 0.1% to 2.0% by weight, more preferably 0.1% to 1.5% by weight.

The hydrogen ion concentration of the maleic acid-modified polypropylene (F) is preferably 5.0 to 6.6, more preferably 5.5 to 6.3 in view of pigment dispersibility.

The mixing ratio of the maleic acid-modified polypropylene (F) is preferably 0.1 to 2.0 parts by weight, more preferably 0.2 to 1.5 parts by weight based on 100 parts by weight of the polypropylene-based composition (D) in view of pigment dispersibility and impact strength.

The melt flow rate of the maleic acid-modified polypropylene (F) is preferably 30 g/min. or more, more preferably 35 g/min. or more in view of flowability.

Examples of the maleic acid-modified polypropylene (F) include those obtained by graft modification of a crystalline propylene homopolymer, a crystalline ethylene-propylene copolymer, or a crystalline propylene-α-olefin copolymer with maleic acid in the presence of a radical initiator.

The process for preparing the maleic acid-modified polypropylene (F) is not particularly limited. Examples of such processes include a method of modification of a crystalline propylene homopolymer, a crystalline ethylene-propylene copolymer, or a crystalline propylene-α-olefin copolymer in the presence of a radical initiator, wherein the modification is carried out by a melt-kneading, solution modification, heterogeneous system modification using a dispersion of powder of the polymer in a non-solvent medium, or a method in which the polymer in a powdery state in the absence of a solvent or in the presence of a small amount of a solvent at a temperature not higher than the melting point of the polymer, is modified. Among them, the melt-kneading is preferable because it is capable of preparing a high-performance modified polymer efficiently and economically.

The process for producing the polypropylene resin composition of the present invention is not particularly limited. For example, a kneading process using a kneader such as a single-screw extruder, a twin-screw extruder, a Banbury mixer, and a hot roll, can be mentioned. Addition or mixing of the respective components of the composition may be performed either simultaneously or divisionally.

The kneading temperature is usually 170 to 250° C., more preferably 190 to 230° C. The kneading time is usually 1 to 20 minutes, more preferably 3 to 15 minutes.

Besides the components (A) to (C), and optional components (E) and (F) subjected to kneading in such a kneader, other additives maybe appropriately added unless the purpose and advantages of the present invention are impaired. Examples of such additives include antioxidants, UV absorbers, lubricants, pigments, antistatic agents, copper-harm preventing agents, flame retardants, neutralizing agents, foaming agents, plasticizers, nucleating agents, antifoaming agents, and crosslinking agents.

Injection-molded articles can be made of the polypropylene resin composition of the present invention by a generally known injection molding. Those are suitably used as injection-molded articles for automobiles, such as a door trim, a pillar, an instrumental panel, and a bumper.

Hereinafter, the present invention will be described by way of examples, which are merely illustrative and are not limitative of the present invention.

Methods of measuring the physical properties of resin components and resin compositions used in Examples and comparative Examples are as follows.

(1) Melt Flow Rate (MFR, Unit: g/10 min)

It was measured according to JIS-K-6758. The measurement was conducted at 230 C. under a load of 2.16 kg unless otherwise particularly pointed out.

(2) Viscosity ($\eta$)

It was measured using "CAPILLOGRAPH 1B" manufactured by TOYOSEIKI SEISAKUSHO, Ltd under the following conditions:

Measurement temperature: 220 C.

L/D: 40

Shear rate: 1216 $sec^{-1}$ (3) Hydrogen ion Concentration

It was measured according to JIS-K-5101

(4) Maleic acid-modified Amount

A sample prepared by dissolving maleic acid-modified polypropylene (F) in xylene and then purifying it by precipitation with acetone was subjected to measurement by alkalimetry.

(5) Pigment Dispersibility

A test piece (plate-shaped molded product having a size of 103×133×2 mm) molded by injection molding was judged whether the pigment dispersibility thereof was good or bad by visual observation.

(Production of Polypropylene-based Composition (D))

The polypropylene-based composition (D) was produced according to the following method. The respective components were weighed to predetermined amounts and homogeneously premixed together using a Henschel mixer or a tumbler, and then the resulting premix was kneaded and extruded using a twin-screw kneading extruder ("TEX44SS 30BW-2V MODEL" manufactured by Japan Steel Works, Ltd.) at an extrusion rate of 30 to 50 kg/hr with the screws revolving at 350 rpm under vent suction, to give the polypropylene-based composition (D). The screw was constructed by arranging a triple thread type rotor and a kneading disc in two kneading zones which are the zone subsequent to the first feed inlet and the zone subsequent to the second feed inlet, respectively.

(Preparation of Injection-molded Article)

The aforementioned injection-molded article as a test piece to be evaluated was prepared according to the following method. The polypropylene-based composition (D) dried with a hot air dryer at 120° C. for two hours was homogeneously premixed with the pigment master batch (E) using a Henschel mixer or a tumbler, and then the resulting premix was injection-molded to obtain the injection-molded article as a test piece with a SUMITOMO-NESTAL injection molding machine (NEOMAT75/SYCAP-M MODEL) under the conditions: molding temperature=220° C., mold cooling temperature=50° C., injection time=15 sec., and cooling time=30 sec.

(Polypropylene Resin (A))

An ethylene-propylene block copolymer (abbreviated as "BC-1") and propylene homopolymers 1, 2 and 3 (abbreviated as "PP-1", "PP-2" and "PP-3", respectively) were used as polypropylene resin (A) in Examples and Comparative Examples. Melt flow rates of these resins are shown in Table 1.

(Pigment Master Batch (E))

Pigment master batches 1, 2 and 3 (abbreviated as "pigment-1,-2 and -3", respectively) were used as pigment master batch (E) in Examples and Comparative Examples. Their physical properties are shown in Table 2.

(Maleic Acid-modified Polypropylene (F))

Maleic acid-modified polypropylenes A and B (abbreviated as "modified PP-A" and "modified PP-B", respectively) were used as maleic acid-modified polypropylene (F) in Examples and Comparative Examples. Their physical properties are shown in Table 3.

(Compositions 1 to 5)

Compositions 1 to 5 shown in Table 4 were used as polypropylene-based composition (D) in examples and comparative examples. In compositions 1 to 5, an ethylene-1-octene copolymer rubber (EOR) was used as the ethylene-α-olefin copolymer rubber, a styrene-ethylene-butene-styrene rubber (SEBS) was used as the aromatic vinyl-containing rubber, and talc having an average particle diameter of 1.8 is determined by centrifugal sedimentation analysis and a hydrogen ion concentration of 8.9 was used as the talc. The mixing proportions (% by weight) of the components of compositions 1 to 5 and the melt flow rate and the viscosity ηcomp of each of compositions 1 to 5 are shown in Table 4.

EXAMPLES 1 to 6 and COMPARATIVE EXAMPLES 1 and 2

A polypropylene resin composition was prepared using any one of the pigment master batches 1 to 3 (pigments-1 to -3) shown in Table 3 and any one of the polypylene resin compositions (compositions-1 to -5) shown in Table 4. The pigment master batch was added in an amount of 3 parts by weight to 100 parts by weight of the polypropylene resin composition. Molded products obtained by injection-molding the polypropylene resin compositions thus prepared were evaluated as to their appearances as Examples 1 to 6 and Comparative Examples 1 and 2, and the results of the evaluation are shown as pigment dispersibility in Table 5. Table 5 also shows the viscosity ratio (ηpig/ηcomp) of the viscosity ηpig of the pigment master batch and the viscosity ηcomp of the polypropylene resin composition.

TABLE 1

|  | Melt flow rate (g/10 min.) |
|---|---|
| BC-1 | 45 |
| PP-1 | 300 |
| PP-2 | 120 |
| PP-3 | 10 |

BC-1: ethylene-propylene block copolymer 1 [Intrinsic viscosity [η] of propylene homopolymer portion: 0.95 dl/g(in tetralin at 135° C.), intrinsic viscosity [η] of ethylene-propylene random copolymer portion: 5 dl/g, content of ethylene-propylene random copolymer portion: 12% by weight, ethylene content in the ethylene-propylene random copolymer portion: 32% by weight]

PP-1 to -3: propylene homopolymers 1 to 3

TABLE 2

|  | Melt flow rate (g/10 min.) | Viscosity | Hydrogen ion concentration |
|---|---|---|---|
| Pigment-1 | 6 | 912 | 6.0 |
| Pigment-2 | 44 | 502 | 6.0 |
| Pigment-3 | 194 | 273 | 6.1 |

Pigment-1: Base polymer; propylene homopolyme(MFR = 6 g/min.)
Pigment-2: Base polymer; homopolypropylene(MFR = 40 g/min.)
Pigment-3: Base polymer; homopolypropylene(MFR = 120 g/min.)
Base polymer/pigment(gray color) = 60/40(weight ratio)

TABLE 3

|  | Melt flow rate (g/10 min) | maleic acid-modified amount (% by weight) | Hydrogen ion concentration |
|---|---|---|---|
| Modified PP-A | 37 | 0.2 | 6.1 |
| Modified PP-B | 260 | 1.3 | 6.1 |

Modified PP-A and -B: maleic acid-modified polypropylenes A and B

TABLE 4

|  |  | Composition-1 | Composition-2 | Composition-3 | Composition-4 | Composition-5 |
|---|---|---|---|---|---|---|
| Composition (% By Weight) | BC-1 | 30 | 30 | 30 | 30 | 30 |
|  | PP-1 | 33 | 33 | 33 |  |  |
|  | PP-2 |  |  |  | 33 |  |
|  | PP-3 |  |  |  |  | 33 |
|  | EOR | 15 | 15 | 15 | 15 | 15 |
|  | SEBS | 2 | 2 | 2 | 2 | 2 |
|  | talc | 20 | 20 | 20 | 20 | 20 |
| Maleic Acid-Modified Polypropylene | Modified PP-A (Parts by weight) | — | 0.3 | — | 1.0 | — |
|  | Modified PP-B (Parts by weight) | — | — | 0.5 | — | 1.0 |
| Melt Flow Rate (g/10 min) |  | 30 | 27 | 24 | 42 | 9 |
| Viscosity η comp (poise) |  | 537 | 568 | 591 | 470 | 880 |

EOR: ethylene-1-octene copolymer rubber(Engage EG 8200, manufactured by Dupont-Dow Elastomer Co., Ltd)
SEBS: styrene-ethylene-butene-styrene rubber (Craton G1657 manufactured by Craton Polymer Co., Ltd.)

The added amount of the maleic acid-modified polypropylene shown in Table 4 was based on 100 parts by weight of the total amount of a polypropylene resin selected from BC-1 and PP-1 to -3, and EOR, SEBS and talc.

TABLE 5

|  |  |  | η pig/ η comp | Pigment dispersibility |
|---|---|---|---|---|
| Example 1 | Pigment-3 | Composition-1 | 0.48 | ○ |
| Example 2 | Pigment-3 | Composition-4 | 0.58 | ○ |
| Example 3 | Pigment-2 | Composition-2 | 0.88 | ○ |
| Example 4 | Pigment-2 | Composition-4 | 1.07 | ○ |
| Example 5 | Pigment-3 | Composition-1 | 0.51 | ○ |
| Example 6 | Pigment-3 | Composition-3 | 0.46 | ○ |
| Comparative example 1 | Pigment-3 | Composition-5 | 0.31 | X |
| Comparative example 2 | Pigment-1 | Composition-4 | 1.94 | X |

○: good,
X: bad

The present invention provides a polypropylene resin composition excellent in pigment dispersibility and an injection-molded article thereof suitable for automobile parts.

What is claimed is:

1. A polypropylene resin composition comprising:
   100 parts by weight of a polypropylene-based composition (D) comprising 50% to 95% by weight of a polypropylene (A), 0% to 25% by weight of an ethylene-α-olefin copolymer rubber and/or aromatic vinyl-containing rubber (B), and 5% to 25% by weight of talc (C) having an average particle diameter of not more than 3 μm; and
   0.5 to 8.0 parts by weight of a pigment master batch (E) having a hydrogen ion concentration of 5 to 7 and satisfying the expression $0.35 \leq \eta\text{pig}/\eta\text{comp} \leq 1.20$, wherein the ηpig represents a viscosity (poise) of the pigment master batch, and the ηcomp represents a viscosity (poise) of the polypropylene composition (D).

2. The polypropylene resin composition according to claim 1, wherein the talc (C) has a hydrogen ion concentration of 8 to 10.

3. The polypropylene resin composition according to claim 1, which further comprises 0.1 to 2.0 parts by weight of a maleic acid-modified polypropylene (F) having a maleic acid content of 0.1% to 2.0% by weight, a melt flow rate of not less than 30 g/min., and a hydrogen ion concentration of 5 to 6.6.

4. The polypropylene resin composition according to claim 1, wherein the hydrogen ion concentration of the pigment master batch (E) is 5.5 to 6.5, and the pigment master batch (E) satisfies the expression $0.45 \leq \eta\text{pig}/\eta\text{comp} \leq 1.10$.

5. An injection-molded article comprising the polypropylene resin composition of claim 1.

6. The polypropylene resin composition according to claim 1, wherein the polypropylene (A) is present in amount of 60% to 85% by weight in the composition (D).

7. The polypropylene resin composition according to claim 1, wherein the ethylene-α-olefin copolymer rubber and/or aromatic vinyl-containing rubber (B) is present in an amount of 5% to 20% by weight in the composition (D).

8. The polypropylene resin composition according to claim 1, wherein the pigment master batch (E) is present in an amount of 1.0 to 6.0 parts by weight based on 100 parts by weight of the composition (D).

9. The polypropylene resin composition according to claim 1, wherein the talc (C) is present in an amount of 10% to 25% by weight in the composition (D).

10. The polypropylene resin composition according to claim 1, wherein the polypropylene (A) is present in amount of 60% to 85% by weight in the composition (D), the ethylene-α-olefin copolymer rubber and/or aromatic vinyl-containing rubber (B) is present in an amount of 5% to 20% by weight in the composition (D), the talc (C) is present in an amount of 10% to 25% by weight in the composition (D), and the pigment master batch (E) is present in an amount of 1.0 to 6.0 parts by weight based on 100 parts by weight of the composition (D).

* * * * *